United States Patent
Klots et al.

[11] Patent Number: 6,144,983
[45] Date of Patent: Nov. 7, 2000

[54] METHOD AND APPARATUS FOR DYNAMIC LOCK GRANULARITY ESCALATION AND DE-ESCALATION IN A COMPUTER SYSTEM

[75] Inventors: Boris Klots, Belmont; Roger J. Bamford, Woodside, both of Calif.

[73] Assignee: Oracle Corporation, Redwood Shores, Calif.

[21] Appl. No.: 09/094,214

[22] Filed: Jun. 9, 1998

[51] Int. Cl.[7] .............................. G06F 9/00; G06F 15/00
[52] U.S. Cl. ................................................. 709/104; 707/8
[58] Field of Search ................................. 707/8; 710/200; 711/163; 709/104

[56] References Cited

U.S. PATENT DOCUMENTS

| | | |
|---|---|---|
| 5,339,427 | 8/1994 | Elko et al. . |
| 5,440,732 | 8/1995 | Lomet et al. . |
| 5,485,607 | 1/1996 | Lomet et al. . |
| 5,551,046 | 8/1996 | Mohan et al. ............................ 395/800 |
| 5,893,086 | 4/1999 | Schmuck et al. ............................ 707/1 |

OTHER PUBLICATIONS

A.M. Josh, "Adaptive Locking Strategies in a Multi–Node Data Sharing Environment," Digital Equipment Corporation, Database Systems Engineering Group, Nashua, New Hampshire 03062, 11 pages.

D.E. Knuth, *The Art of Computer Programming*, vol. 3 2nd edition, "Sorting and Searching," Addison–Wesley Publishing Co., Mar. 1998; ISBN 0–201–89685–0; pp. 513–538, Table of Contents (xii–xiii); Index and Glossary (pp. 757–780).

*Primary Examiner*—Jack A. Lane
*Attorney, Agent, or Firm*—Lyon & Lyon LLP

[57] ABSTRACT

A method and apparatus for dynamic lock granularity escalation and de-escalation in a computer system is provided. Upon receiving a request for a resource, a scope of a previously granted lock is modified. According to one embodiment, hash lock de-escalation is employed. In hash lock de-escalation, the scope of the previously granted lock held on a set of resources is reduced by de-escalating the previously granted lock from a coarser-grain lock to one or more finer-grain locks on members of the set. According to another embodiment, hash lock escalation is employed. In hash lock escalation, the scope of previously granted locks held on one or more members of the set of resources are released and promoted into a coarser-grain lock that covers the set of resources as well as the requested resource.

33 Claims, 4 Drawing Sheets

METHOD AND APPARATUS FOR DYNAMIC LOCK GRANULARITY ESCALATION AND DE-ESCALATION IN A COMPUTER SYSTEM

FIELD OF THE INVENTION

The present invention relates to locking data in a computer system, and more specifically, to a method and apparatus for dynamically adjusting the granularity of hash locks held by a transaction that accesses data in a computer system.

BACKGROUND OF THE INVENTION

In computer systems that are capable of running multiple processes concurrently, the possibility exists for data to be accessed by more than one process at the same time. If not controlled, concurrent accesses to the same data may compromise data integrity. Thus, various mechanisms have been developed to ensure data integrity.

One such mechanism requires each process to obtain a lock on a particular block of data before accessing any data within the block. As used herein, the term "block" refers to any set of data, regardless of whether each item in the set of data corresponds to a particular table, row or object. When a block is locked, only the locking process can access the data within the block. Once the process holding the lock completes, the process releases the lock and another process can access the data by obtaining the lock.

When implementing a locking mechanism, the granularity of the locks has an effect on how the system functions. As a general rule, the smaller the amount of data covered by each individual lock, the less likely that the system will experience "false conflicts". A false conflict may occur, for example, when a first process is holding a lock on a table in order to update row A of the table, while a second process requests a lock in order to update row B of the table and is prevented from doing so because the entire table is locked by the first process. Consequently, most applications running on a multitasking computer system, such as a database application, favor fine-grain locking (e.g., locking individual rows) over coarse-grain locking (e.g., locking entire tables).

However, in many multiprocessing computer systems, a finite number of locks are available. In such systems, it is possible to run out of locks when multiple processes are performing many updates using fine-grain locks. To prevent running out of locks, many such systems include a lock granularity escalation mechanism that convert fine-grain locks to coarser-grain locks when the number of locks available within the system is low. For example, a process may hold row locks on each of five rows of a particular table. During the lock escalation process, the process would obtain a single lock on the entire table and release the five locks it previously possessed. The released locks increase the number of locks available in the pool of locks used by the various processes in the system. Unfortunately, lock escalation to coarser-grain locks also increases the likelihood of false conflicts, as described is above.

A technique similar to lock escalation, referred to as lock de-escalation, has been used in a lock manager (the "VMS lock manager") developed by Digital Equipment Corporation and described in Adaptive Locking Strategies in a Multi-Node Data Sharing Environment, A.M. Joshi, Digital Equipment Corporation, Database Engineering Group, which is incorporated herein by reference. In the VMS lock manager, a set of objects may be organized into a tree-structured granularity hierarchy. When a process requires access to a resource, the process obtains a "strong lock" at the root of a resource hierarchy. This lock implicitly covers all objects that are descendants of the root object. When there is a conflict at the root of the hierarchy, the process downgrades its lock on the root to a "weak" lock, and obtains a "strong" lock at the next level in the hierarchy tree. This process can continue until either there is no lock conflict or the "strong" lock is at the leaf level of the hierarchy.

The above referenced escalation and de-escalation techniques are known for tree-structured granularity hierarchies and are typically implemented in conjunction with a locking technique known as "range locking". In range locking, the tree-structured hierarchy works much like a B-tree type index. A distinguishing characteristic of a known range locking scheme (whether or not escalation or de-escalation techniques are employed) is that ranges of resources are locked together in contiguous sets. For example, a range locking scheme would lock all the records in a table when acquiring the broadest scope of lock, whereas the narrowest scope of lock would be a lock on a single record. In between, groups of arbitrary sizes of records may be locked as a "range" with a single lock, as opposed to more fine-grained locks on individual records. In other words, the first ten records of the table may be locked, or the last ten records, or a set of ten contiguous records somewhere in between the first and last records of the table.

FIG. 1 depicts a table 100, wherein the table comprises two columns, a row ID column 102 and a data column 104. Also depicted in FIG. 1 is a tree-type lock 150. The tree-type lock 150 comprises three levels of locks in the hierarchy. The first range 152 represents a coarse-grain lock on all of the records in the table, specifically records identified by row IDs 0 through 11. The second and third ranges, 154 and 156 respectively, represent a finer granularity of lock (but not the finest) which locks row IDs 0 through 5 and 6 through 11 respectively. The finest granularity locks are the row level locks, e.g., locks 158 and 160.

A problem with range locking techniques, whether or not they employ lock escalation, lock de-escalation, or both, is that a particular resource on a disk may get a high amount of activity relative to other resources. The resource is, consequently, called a "hotspot". For example, numerous transactions might read and then write to the hotspot frequently. When multiple processes are continually accessing the same hotspot on the disk (and there may be many such hotspots), there may be significant contention for the same set of resources, and the propensity for false conflicts and deadlocks will be high, specially in a range locking escalation or de-escalation scheme.

For example, assume that the records with row IDs 0 and 2 contain data that is frequently updated. A first process that updates the record with row ID 0 might lock range 154, which will lock records with row IDs 0, 1, 2, 3, 4 and 5 in table 100, even though the first process is only updating the record associated with row ID 0. A second, concurrent process may request to lock the record identified by row ID 1. A false conflict results because the first process was implicitly holding a lock on row IDs 0 through 5. In a lock de-escalation scheme, the lock on range 154 would be downgraded to an individual, explicit lock on row ID 0. Consequently, the second process can now obtain a lock on row ID 1.

Because the records associated with row IDs 0 and 2 are hotspots, the need to perform this same downgrade operation may occur nearly every time a lock is obtained on range 154. Performing such downgrades increases the overhead associated with updating records. Thus, it may ultimately be more efficient to forego any use of range locks rather than suffer the penalty associated with having multiple hotspots covered by the same range lock.

The locality of reference for hotspots is often high, which means that resources in the hotspot are all within a relatively close proximity to each other. In such a circumstance, a tree-type locking escalation or de-escalation scheme is inefficient. Locks will be escalated or de-escalated continually and the issue of false conflicts and deadlocks will have to be addressed at the further expense of system resources and processing time. Further, a tree-type locking hierarchy usually necessitates a number of different modes of locks and at a number of levels of granularity. For example, a lock is typically taken at each level of the tree from the root node (e.g., the coarse-grain lock range 152) clear down to the desired granularity (e.g., range 154 and finally lock 158), which requires multiple locks to isolate a single resource.

Thus, there is a need in the art for more efficient locking escalation and de-escalation technique.

SUMMARY OF THE INVENTION

A method and apparatus for dynamic hash locking escalation and de-escalation in a computer system is provided.

According to one aspect of the invention, the method comprises receiving a request for a lock on a resource. Next, a hash value is generated based on a hash function and the hash value is mapped to a hash bucket. According to another aspect of the invention, a scope of a previously granted lock may be reduced by dynamically de-escalating the lock request from a coarser-grain lock to a finer-grain lock.

According to another aspect of the invention, dynamic lock escalation may be employed wherein a number of previously granted finer-grain locks held on resources are promoted into a smaller number of coarser-grain locks and the finer-grain locks are released. The newly acquired coarser-grain locks cover at least the same set of resources as the locks that were released, but with fewer locks.

According to one embodiment of the invention, a log file is created that records access paths to resources over a period of time. The log file is analyzed to identify locations of high activity or frequency of access (e.g., hotspots) and, based on the analysis, a hash function is generated which distributes adjacent resources in hotspots into disjoint sets of resources.

Relative to prior solutions of lock escalation and de-escalation, use of the hash lock escalation and de-escalation techniques described herein tends to reduce the number of locks, the number of deadlocks, and the amount of system resources used within a system.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus for dynamic lock granularity escalation and de-escalation in a computer system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
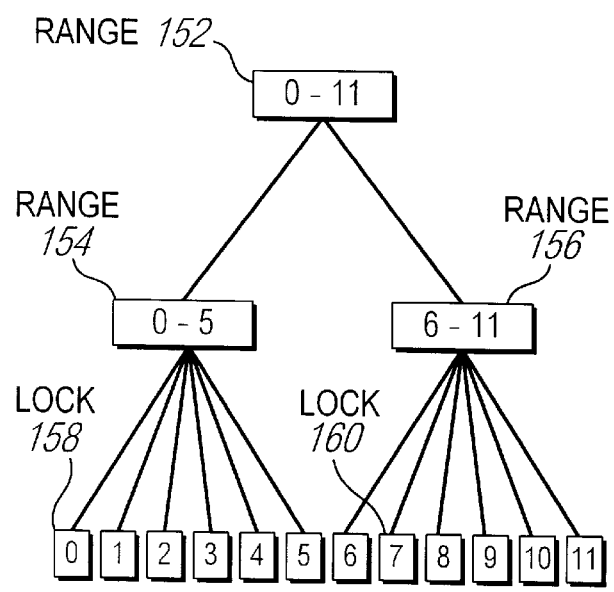
FIG. 1 is an illustration of a table and an existing tree-type locking structure.
Figure 2:
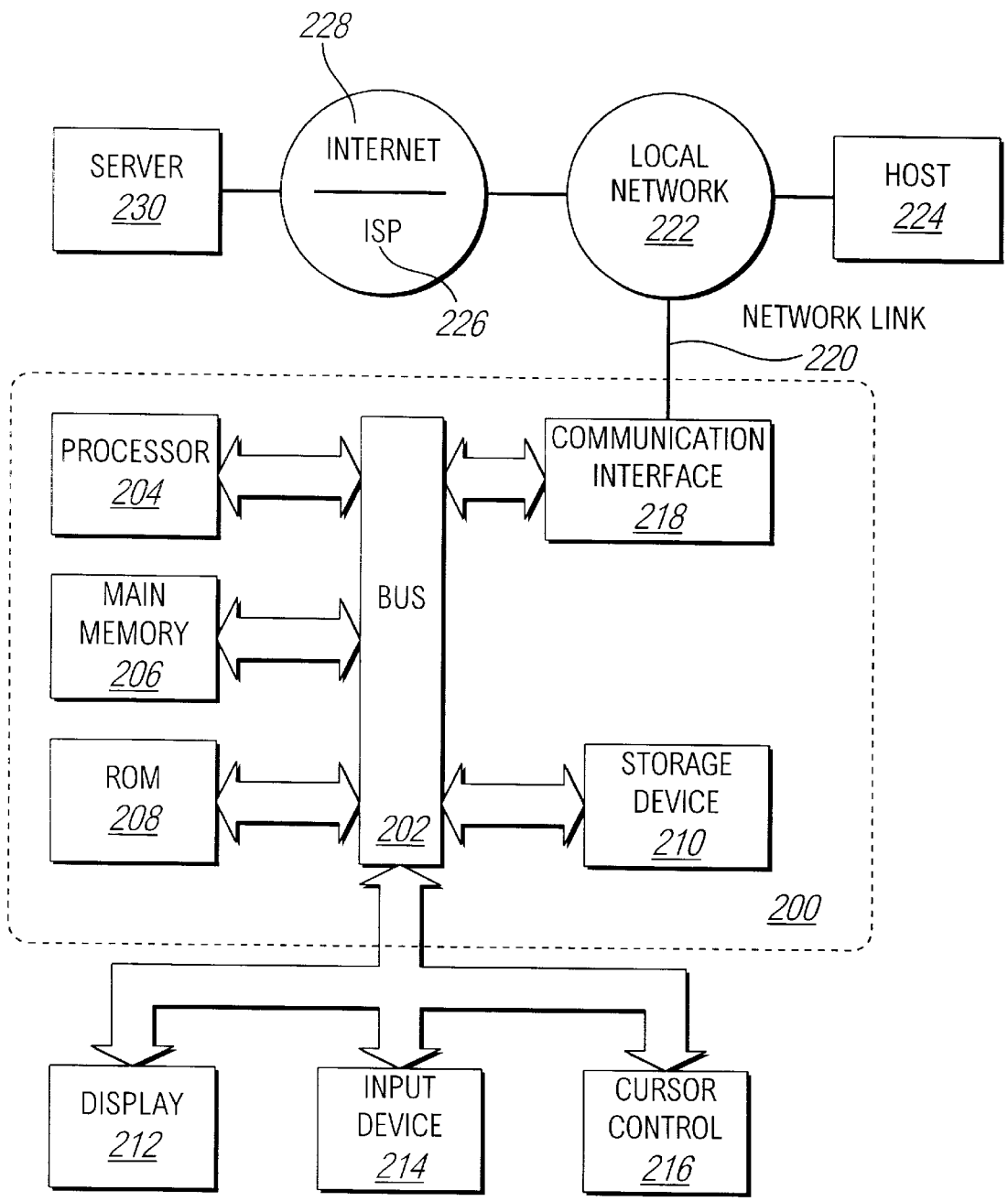
FIG. 2 is a block diagram of a computer system upon which one embodiment of the present invention can be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for dynamic lock granularity escalation and de-escalation. According to one embodiment of the invention, dynamic lock granularity escalation and de-escalation is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for dynamic lock granularity escalation and de-escalation as described herein.

The received code may be executed by processor 204 as it is received, and/or stored in storage device 210, or other non-volatile storage for later execution. In this manner, computer system 200 may obtain application code in the form of a carrier wave.

ISOLATION

As used herein, isolation is a term generally used to describe one of the properties desirable of transactions, including transactions in a database system. To say a transaction is isolated, or exhibits the property of isolation, is to say that the transaction can execute in parallel with any other transaction and yet the reading and writing activity of the transactions will have no effect on any other concurrently executing transactions.

Locking schemes are often used to provide isolation. Locking schemes generally operate by requiring processes to obtain locks on resources before they can access the resources in certain ways (e.g., reading from or writing to a resource). A lock manager is a set of one or more of executing processes that control the locking scheme. The lock manager is a "gatekeeper" for the locks in the database system.

LOCK GRANULARITY

In a hierarchical locking scheme, the request for a lock generally specifies the granularity of a lock that is desired. The granularity of the lock indicates the scope of the lock that will be acquired. For example, if a coarse-grain lock is desired, a lock on an entire table may be acquired. However, if a fine-grain lock is desired, a lock on a particular row or range of rows in a table may be acquired.

The granularity of a lock may be specified explicitly or implicitly at the time a lock is requested. The granularity of a lock may be explicitly specified, for example, by requesting a fine-grain lock on the finest granularity resource in the lock hierarchy. For example, if a row is the finest granularity of resource, then granting a fine-grain exclusive lock on row A explicitly locks the resource row A. Generally, if the granularity of the lock is explicitly requested, the lock that is granted is of the same granularity.

The granularity of a lock may be implicitly specified, for example, by requesting an exclusive lock on a resource that is not the finest granularity resource in the lock hierarchy. If the finest granularity resource is a row, and the next coarser-granularity resource is a table that contains that row, then requesting a lock on the table implicitly locks all the row in the table. For example, if table X contains rows A, B and C, then ranting an exclusive lock on table X explicitly locks resource table X, but implicitly locks the resources rows A, B and C.

According to one embodiment, a lock granularity is specified on the locks requested, either explicitly (e.g., only row A is desired, but coarse-granularity lock on row A is requested) or implicitly (e.g., a requests on a set of resources) by the requester or by the lock manager. For example, a lock granularity is implicit in the requestor's request for a resource (e.g., a name of the resource alone identifies the granularity of the requested lock) and the scope of the lock may be dynamically adjusted by the lock manager. Whether the granularity is explicitly or implicitly requested, the scope of the lock that is requested/granted may be dynamically adjusted by the lock manager when the lock manager hashes the request for the resource.

LOCK MODES

Another property of most locking schemes is a lock mode. Modes of locks indicate the type of activity a lock requester is likely to perform on the desired resource. For example, a share lock is all that is typically required if a process or transaction is reading a resource. Multiple processes are able to hold a share lock on the same resource at the same time. However, multiple processes are generally not able to hold an exclusive lock on the same resource at the same time.

The exclusive lock is typically associated with writing activity, since only one process may hold the lock at any given time, other processes can be assured that the statements or activity that they perform on the locked resource will be isolated from the activity of other processes. Generally, it is not possible for two users or processes acquire more than one exclusive lock on the same resource, such locks are said to be "incompatible" lock modes. However, it is, generally, possible for two users or processes to acquire more than one share lock on the same resource, such locks are said to be "compatible" lock modes.

It is desirable, according to the present invention, to employ various modes of locks. For purposes of explanation, the lock modes of the lock requests described herein are exclusive unless otherwise specified.

HASH FUNCTIONS

A hash function is a function that assigns a data item or resource distinguished by some key (for example, a primary key, or a block ID) into one of a plurality of "hash buckets". One of the purposes of employing the hash function is to distribute the data items associated with the hash function evenly among the bash buckets. For example, a table might have twelve rows wherein each row is identified by a row ID (e.g., 0, 1, 2 . . . 11) and a hash function may have three buckets associated with it. One way to distribute the twelve rows among the three hash buckets is to divide the row ID (numerator) by three (denominator) and then assign the corresponding row to the hash bucket identified by the remainder of the operation (e.g., 0, 1 or 2).

According to embodiments of the invention, a hash function is used to transform a request for a resource into a lock on a collection (or bucket) of resources. For example, using hash functions to implement part of the locking scheme can remove complexity from a database application's logic, so that the application does not need to know a locking hierarchy (e.g., the application does not need to know that a coarse-grain lock on row A is a lock on table X). Instead, the application only needs to know the hash function. According to one embodiment, the locking is handled by the database server (e.g., in the "kernel"), rather than by the application. This process is called "hash locking", and generally refers to providing locks that cover buckets of resources, where each bucket includes all resources whose identifiers hash to the bucket. Hash locking is described in detail below.

It is possible to derive a hash function that distributes resources with similar keys into the same bucket. For example, the rows with row IDs 0 through 3 would go into one bucket, the rows with row IDs 4 through 7 would go into a second bucket, and the rows with row IDs 8 through 11 would go into a third bucket. However, according to one embodiment, it is preferable to employ a hash function that does not distributed resources in such a manner. Rather, it is desirable to employ a hash function that distributes keys in a disjoint manner to create buckets with non-contiguous sets of resources.

HASH INDEXES

As opposed to a B-tree indexing scheme (described above), hash functions are frequently used as an alternative indexing scheme. The indexing scheme is often referred to as a "hash index". A hash index is distinct from a B-tree index because the B-tree index has multiple levels (nodes) that are traversed when searching for a value, and leaf nodes in a B-tree index normally have contiguous ranges of key values that identify a resource. On the other hand, the hash index typically has one level (the bucket) so multiple levels (nodes) are not traversed. Rather, a transform (the hash function) is applied to the value desired and the search begins in the bucket identified by the transform. An advantage of the hash index is its speed. Hashing, in general, is known in the art. More information on hashing may be found in The Art of Computer Programming, Vol. 3, 3rd edition, Addison-Wesley, 1997, D. E. Knuth, which is incorporated herein by reference.

HASH LOCKING

Figure 3:
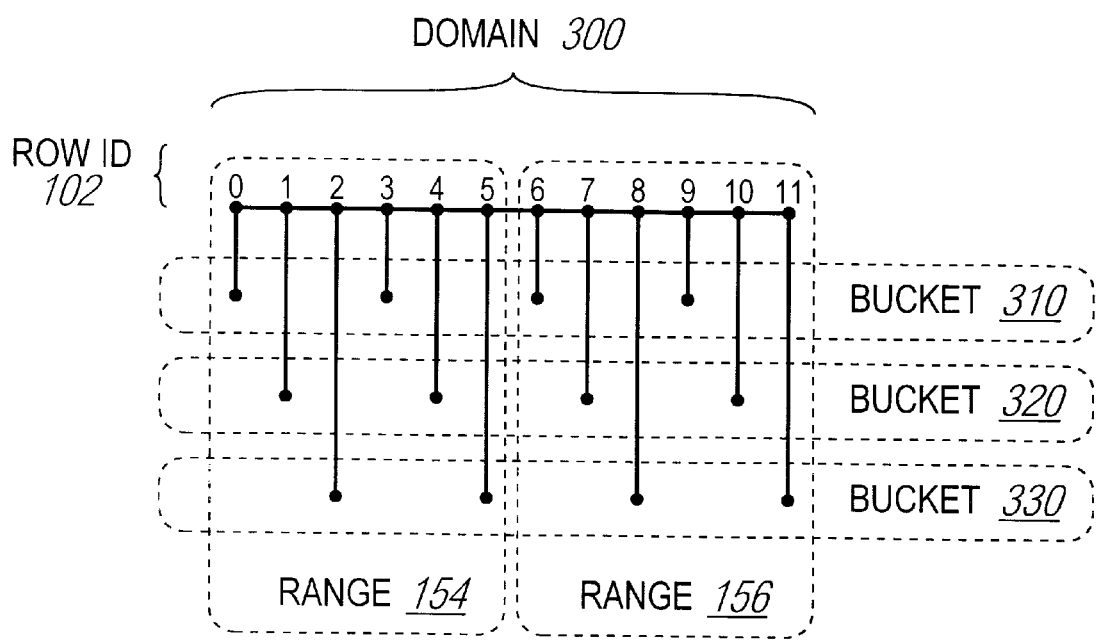
FIG. 3 is an illustration of a hash locking scheme according to an embodiment of the present invention.

Hash locking generally refers to providing locks which cover buckets of resources, where each bucket includes all resources whose identifiers (e.g., resource name or key value) hash to the bucket. FIG. 3 depicts, in general, the difference between the distribution of resources with a hash locking versus a range locking scheme.

Domain 300 contains a range of row IDs. Distributing the row IDs with a range locking scheme, contiguous ranges 154 and 156 result. However, when distributing the resources using hash locking, the resources are distributed in disjoint sets into hash buckets 310, 320 and 330, rather than contiguous ranges. Hash bucket 310 comprises row IDs 0, 3, 6 and 9. Hash bucket 320 comprises row IDs 1, 4, 7 and 10. Finally, hash buck 330 comprises row IDs 2, 5, 8 and 11. Notice that the resources in each hash bucket are not contiguous (e.g., adjacent/sequential row IDs 0 and 1 are not contained in the same hash bucket).

Referring to FIG. 3, if range 154 were locked, then row IDs 0 through 5 would be implicitly locked, or if range 156 were locked, then row IDs 6 through 11 would be implicitly locked. Whereas if hash bucket 310 were locked, then row IDs 0, 3, 6 and 9 would be implicitly locked. If hash bucket 320 were locked, then row IDs 1, 4, 7 and 10 would be implicitly locked. Finally, if hash bucket 330 were locked, then row IDs 2, 5, 8 and 11 would be implicitly locked.

Hash locking differs from range locking in that there is not necessarily any correlation between the hash buckets into which resources are distributed and the physical locality of reference of the keys of the resources. Physical locality of reference refers to the characteristic that resources within a given set will be physically near the other resources in the set. In other locking schemes, such as key-range locking, each resource in a range has a physical locality of reference to another resource in the range (e.g., row ID 0 is physically near row ID 1, which is physically near row ID 2). In key-range locking, the resources are grouped into contiguous, rather than disjoint sets.

However, in hash locking, keys distributed into a hash bucket have more of a logical locality of reference. Logical locality of reference refers to the fact that the relationship between resources in a hash bucket is not based on the resource's relative physical proximity to the other resources in the bucket, but rather, on the logical arrangement of the bits in the resource identifier. Accordingly, a hash function should be chosen that evenly distributes the lock space (or all of the resources available for locking) so that each hash bucket has the same or a similar number of resources. If this is true, then the hash buckets are said to be "balanced".

If a hash function is chosen that does not evenly distribute the lock space among the hash buckets, then there exists a high probability for collisions because resources with similar resource/key values will hash to the same hash bucket.

According to one embodiment of the present invention, a hash function is chosen that distributes adjacent resources in a manner that reduces the likelihood that they will be associated with the same hash bucket. According to another embodiment, hotspots in the disk are identified and a hash function is generated that distributes resources associated with the hotspots with a high degree of dispersion (e.g., if row IDs 0, 1 and 2 comprise the resources in a hotspot, and a hash function distributes the resources between three buckets, then each bucket would get only one of the resources). In this way, the propensity of false conflicts or deadlocks is reduced, especially when performing operations that insert, update or delete records with a high physical locality of reference.

FUNCTIONAL DESCRIPTION

According to one aspect of the present invention, a request for a lock on a resource is received by a lock manager. The lock manager applies a hash function to an identifier associated with the requested resource to produce a hash value. The lock manager then maps, or "hashes" the resource to a particular hash bucket based on the hash value. The hash bucket to which the requested resource is mapped is referred to herein as the "desired" hash bucket.

The desired hash bucket is tested to determine whether a conflicting lock that covers the resource has already been granted (i.e., whether a lock has already been granted on the hash bucket or on the resource itself, whether explicitly or implicitly held). As used herein, a "conflicting lock" is a lock that is held in a incompatible mode or by an incompatible process with another lock request. If there is no conflicting lock, then a hash lock on the hash bucket is acquired. The hash lock covers all resources mapped to the hash bucket. If there is a conflicting lock, then the conflicting lock may be deescalated into a finer granularity lock (lock de-escalation is described in detail below). Alternatively, if a conflicting lock is held by the same process, then the conflicting lock may be escalated into a coarser-grain lock (lock escalation is described in detail below).

DYNAMIC ESCALATION AND DE-ESCALATION

Figure 4:
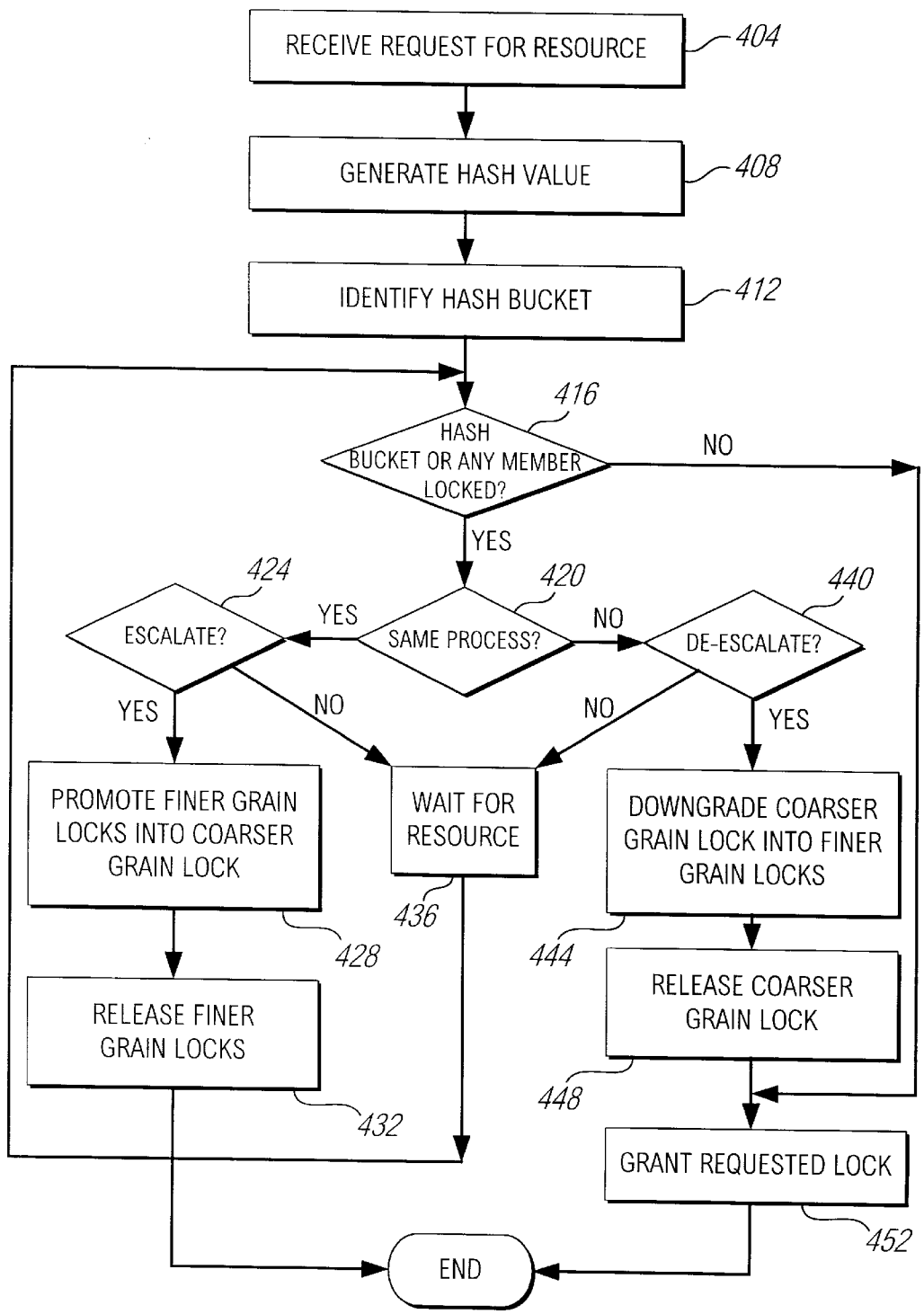
FIG. 4 is flow chart depicting the steps for hash lock escalation and de-escalation according to one embodiment of the present invention.

FIG. 4 depicts the steps for dynamic hash lock granularity escalation and de-escalation according to one embodiment of the present invention. In step 404, the lock manager receives a request for a lock on a resource. Next, in step 408, the lock manager generates a hash value based on a predetermined hash function. In step 412, a hash bucket is identified based on the hash value generated in step 408, and in step 416, a test is performed to determine whether a conflicting lock has been granted (e.g., a lock the hash bucket or any constituent member of the hash bucket).

In response to testing, if the resource is not locked, then a lock on the requested resource is granted in step 452. However, if the resource is locked, then a second test is performed in step 420 to determine whether the conflicting lock is held by the same process.

HASH LOCK ESCALATION

Generally, hash lock escalation is desired when a lock is requested on a hash bucket and, because one or more constituent members of the hash bucket are locked in a non-conflicting mode, finer-grain locks on the constituent members of the hash bucket may be promoted into a coarser-grain lock (e.g., the lock on the hash bucket). According to one embodiment, hash lock escalation replaces finer-grain locks covering a narrower scope of resources, with a coarser-grain lock covering a broader scope of resources.

Returning to the description of FIG. 4, in response to testing in step 420, if the same process does hold a conflicting lock, then another test is performed in step 424 to determine whether the existing lock may be escalated to cover the desired resource (e.g., the present process holds one or more locks on constituent members of the hash bucket).

If the lock may be escalated, then any fine-grain locks (e.g., locks on constituent members of the hash bucket) are promoted into a single coarse-grain lock on the hash bucket in step 428. Next, in step 432, the fine-grain locks are released, the requester is notified of the outcome and the process ends. If the lock may not be escalated (step 424), then the process continues to step 436, where it will wait for the resource to become available or for a clock counter/timer to expire, after which the process return to step 416.

Hash lock escalation may occur in response to different events. For example, ash lock escalation may occur when a process is attempting to obtain a lock on a particular hash bucket or resource. In such a circumstance it may be more efficient to hold a single hash lock covering all the resources in the bucket than it is to hold several hash locks covering each individual resource. According to one embodiment, instead of, or in addition to performing lock escalation in response to lock requests, a periodic test may be performed on the resources that are locked. If a number of individual locks on resources are held by the same entity, and those locks could be more efficiently covered by a single hash lock on a corresponding hash bucket, then the locks are promoted from finer-grain locks to a coarser-grain lock.

HASH LOCK DE-ESCALATION

Generally, hash lock de-escalation is desired when a lock is requested on a resource that maps to a hash bucket that is already locked in a conflicting mode. Consequently, the coarser-grain lock on the hash bucket may be demoted into one or more finer-grain locks on constituent members of the hash bucket. Ideally, once the coarser-grain lock is de-escalated it is possible that a finer-grain lock on the originally requested resource may be acquired. According to one aspect, hash lock de-escalation replaces a coarser-grain lock covering a broader scope of resources with finer-grain locks covering a narrower scope of resources.

Once again returning to the process depicted in FIG. 4, if, in response to testing in step 420, the same process does not hold the conflicting lock, then the process continues to step 440. In step 440, a test is performed to determine whether the existing lock may be de-escalated. The existing lock may be de-escalated if the conflicting lock is a lock on the hash bucket and the desired resource is not explicitly locked by any process. If the lock may be de-escalated, then the coarser-grain lock (e.g., on the hash bucket) is downgraded into finer-grain locks on the individual resources (e.g., locks on constituent members of the hash bucket) in step 444 that are required by the entity that currently holds the lock on the hash bucket. In one embodiment, even if de-escalating the coarsergrain lock into finer-grain locks will not remove the conflict, then the coarser-grain lock will still be de-escalated in anticipation of the specific conflicting lock being released in the future. Additionally, a flag may be set to indicate that the de-escalated locks should not be escalated until the conflicting lock request is resolved.

Note that not all of the constituent members of the hash bucket need be locked in step 444. For example, if a hash lock is held where only a single resource A (in a set of resources in the hash bucket) is actually needed by the entity that holds the has lock, and the requestor needs resource B, (in the set of resources in the hash bucket), then only two fine-grain locks are needed: one on resource A and one on resource B.

Next, in step 448, the coarser-grain lock is released and the process continues to step 452, where a finer-grain lock on the requested resource is granted.

If the lock may not be de-escalated (step 440), then the process continues to step 436, where the process will wait for the resource to become available or for a clock counter/timer to expire, after which the process return to step 416.

According to one embodiment of the invention, hash lock de-escalation occurs when a resource is requested that is implicitly locked by another process in an incompatible lock mode. When this occurs, the previously acquired lock is broken into finer-grain locks so that each resource will be explicitly locked, rather than implicitly locked by a coarser-grain lock. Consequently, false conflicts and deadlocks are less likely to occur than when holding a lock that implicitly covers a number of resources. Deadlocks are less likely to occur because constituent members of the coarse-grain lock (e.g., a lock on the hash bucket) that are not being used by the user or process holding the lock are available for other users or processes to lock. Whereas if a coarse-grain lock (e.g., the lock on the hash bucket) is held, then the constituent members will be marked as locked whether used or not.

EXAMPLE

For example, consider a situation where three separate, concurrent processes are initiated on system 200. The first process desires to modify the row with ID 0, the second process desires to modify the row with ID 1, and the third process desires to modify the row with row ID 2. Each process generates a lock request for the resource it desires. For the purpose of explanation, the hash function, H(x), used to distribute resources into hash buckets equals the remainder of the row ID of the requested resource divided by the number of buckets. Specifically: H(resource)=remainder of (Row ID / 3).

According to one embodiment of the present invention, the lock manager will handle each lock request in the order in which it is received. For purposes of explanation, the order in which the lock requests are received by the lock manager is the first process lock request, followed by the second process lock request and finally the third process lock request. The flowchart depicted in FIG. 4 depicts the steps the lock manager will perform.

In step 404, a lock request from the first process for the row with row ID 0 is received. The hash function, H(resource), is performed on row ID 0 in step 408, which results in a hash value of "0". Next, the hash value "0" is mapped to hash bucket 310 in step 412. In step 416 a test is performed to determine whether hash bucket 310 or any constituent member (e.g., row ID 0, 3, 6 or 9) of the hash bucket 310 is locked. Hash bucket 310 is not locked, nor is any constituent member, so a hash lock on hash bucket 310 is granted to the first process in step 452.

Next, a lock request from the second process for the row with ID 1 is received. The hash function, H(resource), is performed on row ID 1 in step 408, which results in a hash value of "1". Next, the hash value "1" is mapped to hash bucket 320 in step 412. In step 416 a test is performed to determine whether hash bucket 320 or any constituent member (e.g., row ID 1, 4, 7 or 10) is locked. Neither hash bucket 320 or any constituent member is locked, so a hash lock on hash bucket 320 is granted to the second process in step 452.

Finally, a lock request from the third process for the row with ID 2 is received. The hash function, H(resource), is performed on row ID 2 in step 408 which results in a hash value of "2". Next, the hash value "2" is mapped to hash bucket 330 in step 412. In step 416 a test is performed to determine whether hash bucket 330 or any constituent member (e.g., row ID 2, 5, 8, or 11) of the hash bucket 330 is locked. Neither the hash bucket 330 or any constituent member is locked so a hash lock on hash bucket 330 is granted to the third process in step 452.

Now, assume a fourth process requests a lock on a row with an ID 3. The request for row ID 3 from the fourth process is received by the lock manager in step 404. The hash function, H(resource), is performed on row ID 3 in step 408 which results in a hash value of "0". Next, the hash value "0" is mapped to hash bucket 310 in step 412. In step 416 a test is performed to determine whether hash bucket 310 or any constituent member is locked. Hash bucket 310 is locked, so the process continues to step 420.

In step 420, a test is performed to determine if the fourth process already holds the lock on hash bucket 310. The fourth process does not hold a lock on hash bucket 310, so another test is performed at step 440 to determine if the conflicting lock on hash bucket 310 may be de-escalated.

According to one embodiment, the conflicting lock is de-escalated whether or not the conflicting lock will be removed. In this way, once the conflicting lock is released by the process that owns the conflicting lock, then the lock may be acquired by the present process without additional delay.

As a result of testing in step 440, the lock manager determines that hash lock may be de-escalated, so the coarse-grain lock on hash bucket 310 held by the first process is downgraded into a fine-grain lock on the row with ID 0 in step 444. The coarse-grain lock held by the first process on hash bucket 310 is released in step 448. Next, in step 452, the requested lock on row ID 3 is granted (as a fine-grain lock) to the fourth process.

Assume now that the first process releases its lock on the row with row ID 0 and that the fourth process requests a lock on the row with row ID 6. The lock manager receives the lock request for the row with row ID 6 at step 404. The hash function, H(resource), is performed in step 408 on row ID 6 that results in a hash value of "0". In step 412, hash bucket 310 is identified with hash value "0", and in step 416 a test is performed to determine whether hash bucket 310 or any constituent member is locked. Although hash bucket 310 is itself not locked, the row ID 3 (a constituent member of hash bucket 310) is locked, so hash bucket 310 is determined to be locked.

Next, in step 420, a test is performed to determine whether the fourth process holds the lock on the locked member of hash bucket 310. The fourth process is the only process that holds locks on the any member of hash bucket 310, so the process continues to step 424 where a test is performed to determine whether the finer-grain lock on the row with ID 3 should be promoted. In one embodiment, an escalation strategy is employed in which locks are promoted from finer-grain locks (e.g. row locks) to coarser-grain locks (e.g. locks on hash buckets) only after a predetermined number of resources within the bucket are locked by the same entity. In another embodiment, locks may be promoted based upon the probability that the locks will not be de-escalated shortly thereafter.

As a result of testing in step 424, it is determined the lock should be promoted, so a coarser-grain lock on hash bucket 310 is granted (which implicitly locks both the requested resource and the previously locked resource) to the fourth process. Next, in step 432, the finer-grain lock on the row with ID 3 is released, the requestor is notified of the outcome and the process ends.

CHANGING THE HASH FUNCTION

According to one embodiment of the invention, requests for resources are archived in a log file in storage device 210. Periodically, the log file is analyzed to identify hotspots. Once hotspots are identified, the hash function, H(x), is analyzed to determine whether the hash function is evenly distributing resources associated with the hotspots into different hash buckets. Ideally, none of the resources associated with the hotspots will be associated with the same hash bucket. Of course, given the number of resources available in, for example, a very large database with millions of rows, a perfect distribution of the resources in the hotspot is unlikely to occur.

If the hash function, H(x), is not evenly distributing resources associated with the hotspot, then the hash function, H(x), is modified (e.g., H' (x)) so that the resources will be more evenly distributed. For example, the hash function, H(resource), referenced above may efficiently distribute resources associated with a hotspot when a particular range of resources comprises the hotspot (e.g., ranges of three contiguous resources). However, to optimize performance, it is possible that the number of hash buckets should be increased or decreased depending on whether the number of resources associated with hotspots is smaller or larger.

Thus far, a mathematical-type hash function has been described, but other types of hash functions are also useful. For example, Boolean-type hash functions, where a portion of the resource name is operated on by a Boolean operator to transform the requested resource into a hash value may be employed. Similarly, a set of key values that map to a particular hash value could be expressly defined. For example, instead of performing a mathematical function or a Boolean operator on the key value, the key value may be retrieved from a table that has a first column identifying key values and a second column identifying hash values, wherein a row contains a key value and hash value pair. In one embodiment, if the key value is not found in the table, then a hash function (e.g., mathematical or Boolean) is performed on the key value.

D. E. Knuth, in his book The Art of Computer Programming, Vol. 3, 3rd edition, Addison-Wesley, 1997, incorporated by reference above, discusses a number of techniques for transforming a set of keys into unique addresses. The best hash function for a set of key values will vary greatly from implementation to implementation because it depends upon the nature (e.g., distribution and non-randomness) of the keys in the domain of the hash function. The present invention is not limited to any particular implementation or type of hash function.

Further, although the techniques described herein take advantage of the ability to create disjoint sets of non-contiguous resources, it is possible, within a disjoint set of resources (e.g., a hash bucket), that subsets of ranges within the non-contiguous set could occur as a result of the hash function (e.g., hash bucket 310 could contain row IDs 0,1, 5 and 6). Such an embodiment is covered in the broader spirit of the invention.

An advantage of using hash locking over a tree-type locking (or range locking) scheme is that maintenance of the locking hierarchy can be significantly easier. In a tree-type structure, each level of the tree adds complexity and more dependencies upon earlier layers, whereas using the hash locking techniques employing dynamic escalation and de-escalation according to one embodiment, there are less dependencies to maintain (e.g., a shorter path length and easier maintenance). Further, tree-type locking schemes are optimized for a full ordering of the keys, whereas the ordering of the keys is not necessary in the present invention. Finally, as the number of resources in a system grows, the techniques described herein scale significantly better than tree-type locking schemes.

USE IN A BUFFER CACHE

According to one embodiment, the locking techniques described herein are especially useful when used in a buffer cache. A buffer cache is an area of high speed memory (e.g., main memory 206) associated with a node (e.g., computer system 200). The buffer cache is used for temporary storage of data while a node or number of nodes are using or sharing the data. The advantage of copying data from a disk to a buffer cache and making the changes to the buffer cache (which will later be copied back to disk) is the speed with which multiple changes may be made to the buffer cache versus making the changes directly to disk. The buffer cache may be unique to a single node, or it may be shared among a number of nodes. The lock management techniques described herein require less maintenance, they are faster, and they require less resources to be locked than the tree-type locking hierarchy.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing access to a computer data resource, the method comprising:

assigning a plurality of resources to a plurality of hash buckets based on key values associated with said plurality of resources, wherein said step of assigning is performed without respect to any relative order associated with said key values;

receiving a request for a resource in said plurality of resources;

in response to receiving said request, performing the steps of:

generating a hash value based on a key value of said resource;

identifying a hash bucket associated with said hash value;

detecting a granted lock covering any of said plurality of resources in said hash bucket;

modifying a lock scope associated with said granted lock; and granting a new lock that covers said requested resource.

2. The method of claim 1, wherein said plurality of resources that are assigned to a particular hash bucket are disjoint relative to said key values.

3. The method of claim 1, wherein said step of detecting comprises:

testing to determine whether said granted lock covers said hash bucket; and de-escalating said granted lock to cover a first subset of resources in said hash bucket, said first subset not including said requested resource, when said granted lock covers said hash bucket; and wherein said new lock covering said requested resource includes a second subset of resources in said hash bucket, said second subset including said requested resource.

4. The method of claim 1, wherein said step of modifying said lock scope comprises de-escalating said granted lock into one or more a fine-grain locks.

5. The method of claim 1, wherein said request was issued by a requestor, the method further comprising:

testing to determine whether:

said requester already owns one or more locks on a subset of said resources in said hash bucket, said subset including at least one resource other than said requested resource, and a lock on said hash bucket is not owned by any other entity; and escalating said lock on said subset into a lock on said hash bucket, when said requestor already owns said one or more locks on said subset and said lock on said hash bucket is not owned by any other entity.

6. The method of claim 1, wherein said steps of modifying said lock scope and granting said new lock includes escalating said granted lock and said requested resource into a single coarse-grain lock.

7. The method of claim 1, further comprising the steps of:

creating a log of disk access paths over a period of time;

generating a hash function, based upon said log, that maps requests on adjacent resources into coarser-grain hash lock requests on disjoint sets of resources thereby breaking up a hot spot identified by said log.

8. A method for de-escalation of disjoint sets of computer data resources, comprising the steps of:

assigning a plurality of disjoint resources to a plurality of groups;

receiving a request for a lock on a resource in said plurality of disjoint resources; and in response to receiving said request, performing the steps of:

identifying a group in said plurality of groups that includes said requested resource;

detecting a granted lock covering any constituent resource of said group;

modifying a lock scope associated with said granted lock; and granting a new lock that covers said requested resource.

9. The method of claim 8, further comprising the steps of:

creating a log of disk access paths over a period of time; and generating a hash function, based upon said log, said hash function assigning said plurality of disjoint resources into said plurality of groups thereby breaking up a hot spot identified by said log.

10. The method of claim 9, wherein said step of modifying said lock scope comprises de-escalating said granted lock into one or more a fine-grain locks.

11. The method of claim 9, wherein said steps of modifying said lock scope and granting said new lock includes escalating said granted lock and said requested resource into a single coarse-grain lock.

12. A computer system configured to perform the steps of:

assigning a plurality of resources to a plurality of hash buckets based on key values associated with said plurality of resources, wherein said step of assigning is performed without respect to any relative order associated with said key values;

receiving a request for a resource in said plurality of resources;

in response to receiving said request, performing the steps of:

generating a hash value based on a key value of said resource;

identifying a hash bucket associated with said hash value;

detecting a granted lock covering any of said plurality of resources in said hash bucket;

modifying a lock scope associated with said granted lock; and granting a new lock that covers said requested resource.

13. The computer system of claim 12, wherein said plurality of resources that are assigned to a particular hash bucket are disjoint relative to said key values.

14. The computer system of claim 12, wherein said step of detecting comprises:

testing to determine whether said previously granted lock covers said hash bucket; and de-escalating said granted lock to cover a first subset of resources in said hash bucket, said first subset not including said requested resource, when said granted lock covers said hash bucket; and wherein said new lock covering said requested resource includes a second subset of resources in said hash bucket, said second subset including said requested resource.

15. The computer system of claim 12, wherein said step of modifying said lock scope comprises de-escalating said granted lock into one or more a fine-grain locks.

16. The computer system of claim 12, wherein said request was issued by a requestor, the method further comprising:

testing to determine whether:

said requestor already owns one or more locks on a subset of said resources in said hash bucket, said subset including at least one resource other than said requested resource, and a lock on said hash bucket is not owned by any other entity; and escalating said lock on said subset into a lock on said hash bucket, when said requestor already owns said one or more locks on said subset and said lock on said hash bucket is not owned by any other entity.

17. The computer system of claim 12, wherein said steps of modifying said lock scope and granting said new lock includes escalating said granted lock and said requested resource into a single coarse-grain lock.

18. The computer system of claim 12, further configured to perform the steps of:

creating a log of disk access paths over a period of time;

generating a hash function, based upon said log, that maps requests on adjacent resources into coarser-grain hash lock requests on disjoint sets of resources thereby breaking up a hot spot identified by said log.

19. A computer system configured to perform the steps of:

assigning a plurality of disjoint resources to a plurality of groups;

receiving a request for a lock on a resource in said plurality of disjoint resources; and in response to receiving said request, performing the steps of:

identifying a group in said plurality of groups that includes said requested resource;

detecting a granted lock covering any constituent resource said group;

modifying a lock scope associated with said granted lock when a lock is detected; and granting a new lock that covers said requested resource.

20. The computer system of claim 19, further configured to perform the steps of:

creating a log of disk access paths over a period of time; and generating a hash function, based upon said log, said hash function assigning said plurality of disjoint resources into said plurality of groups thereby breaking up a hot spot identified by said log.

21. The computer system of claim 20, wherein said step of modifying said lock scope comprises de-escalating said granted lock into one or more a fine-grain locks.

22. The computer system of claim 20, wherein said steps of modifying said lock scope and granting said new lock includes escalating said granted lock and said requested resource into a single coarse-grain lock.

23. A computer-readable medium having stored therein one or more sequences of instructions for managing access to a data resource, wherein execution of the one or more sequences of instructions by one or more processors causes the one or more processors to perform the steps of:

assigning a plurality of resources to a plurality of hash buckets based on key values associated with said plurality of resources, wherein said step of assigning is performed without respect to any relative order associated with said key values;

receiving a request for a resource in said plurality of resources;

in response to receiving said request, performing the steps of:

generating a hash value based on a key value of said resource;

identifying a hash bucket associated with said hash value;

detecting a granted lock covering any of said plurality of resources in said hash bucket;

modifying a lock scope associated with said granted lock; and granting a new lock that covers said requested resource.

24. The computer-readable medium of claim 23, wherein said plurality of resources that are assigned to a particular hash bucket are disjoint relative to said key values.

25. The computer-readable medium of claim 23, wherein said step of detecting comprises:

testing to determine whether said previously granted lock covers said hash bucket; and de-escalating said granted lock to cover a first subset of resources in said hash bucket, said first subset not including said requested resource, when said granted lock covers said hash bucket; and wherein said new lock covering said requested resource includes a second subset of resources in said hash bucket, said second subset including said requested resource.

26. The computer-readable medium of claim 23, wherein said step of modifying said lock scope comprises de-escalating said granted lock into one or more a fine-grain locks.

27. The computer-readable medium of claim 23, wherein said request was issued by a requestor, the method further comprising:

testing to determine whether:

said requestor already owns one or more locks on a subset of said resources in said hash bucket, said subset including at least one resource other than said requested resource, and a lock on said hash bucket is not owned by any other entity; and escalating said lock on said subset into a lock on said hash bucket, when said requestor already owns said one or more locks on said subset and said lock on said hash bucket is not owned by any other entity.

28. The computer-readable medium of claim 23, wherein said steps of modifying said lock scope and granting said new lock includes escalating said granted lock and said requested resource into a single coarse-grain lock.

29. The computer-readable medium of claim 23, further comprising the steps of:

creating a log of disk access paths over a period of time;

generating a hash function, based upon said log, that maps requests on adjacent resources into coarser-grain hash lock requests on disjoint sets of resources thereby breaking up a hot spot identified by said log.

30. A computer-readable medium having stored therein one or more sequences of instructions for managing access to a data resource, wherein execution of the one or more sequences of instructions by one or more processors causes the one or more processors to perform the steps of:

assigning a plurality of disjoint resources to a plurality of groups;

receiving a request for a lock on a resource in said plurality of disjoint resources; and in response to receiving said request, performing the steps of:

identifying a group in said plurality of groups that includes said requested resource;

detecting a granted lock covering any constituent resource in said group;

modifying a lock scope associated with said granted lock; and granting a new lock that covers said requested resource.

31. The computer-readable medium of claim 30, further comprising the steps of:

creating a log of disk access paths over a period of time;

generating a hash function, based upon said log, said hash function assigning said plurality of disjoint resources into said plurality of groups thereby breaking up a hot spot identified by said log.

32. The computer-readable medium of claim 31, wherein said step of modifying said lock scope comprises de-escalating said granted lock into one or more a fine-grain locks.

33. The computer-readable medium of claim 31, wherein said steps of modifying said lock scope and granting said new lock includes escalating said granted lock and said requested resource into a single coarse-grain lock.

* * * * *

UNITED STATES PATENT AND TRADEMARK OFFICE
CERTIFICATE OF CORRECTION

PATENT NO : 6,144,983

DATED : November 7, 2000

INVENTOR(S) : Boris Klots et al.

It is certified that error appears in the above-identified patent and that said Letters Patent are hereby corrected as shown below:

At column 1, line 47, change "convert" to --converts--.

At column 1, line 57, change "described is" to --is described--.

At column 11, line 15, change "has" to --hash--.

At column 11, line 15, change "B," to --B--.

IN THE CLAIMS:

At column 15, line 23, after "more," but before "fine-grain," delete the word "a".

At column 15, line 27, change "requester" to --requestor--.

At column 16, line 5, after "more," but before "fine-grain," delete the word "a".

At column 16, line 47, after "more," but before "fine-grain," delete the word "a".

At column 17, line 16, insert the word --in-- before the word "said".

At column 17, line 30, after "more," but before "fine-grain," delete the work "a".

At column 18, line 7, after "more," but before "fine-grain," delete the word "a".

UNITED STATES PATENT AND TRADEMARK OFFICE
CERTIFICATE OF CORRECTION

PATENT NO. : 6,144,983
DATED : Nov. 7, 2000
INVENTOR(S) : Boris Klots, et al

Page 2 of 2

It is certified that error appears in the above-identified patent and that said Letters Patent is hereby corrected as shown below:

At column 18, line 61, after "more," but before "fine-grain," delete the word "a".

Signed and Sealed this

Eighth Day of May, 2001

*Attest:*

NICHOLAS P. GODICI

*Attesting Officer*     *Acting Director of the United States Patent and Trademark Office*